(12) United States Patent
LaFleur (10) Patent No.: US 6,510,867 B2
(45) Date of Patent: Jan. 28, 2003

(54) PRESSURE RELIEF VALVE (75) Inventor: Karl K. LaFleur, Weatherford, TX (US)

(73) Assignee: Lafleur Petroleum Services, Inc., Weatherford, TX (US)

(*) Notice: Subject to any disclaimer, the term of this patent is extended or adjusted under 35 U.S.C. 154(b) by 0 days.

(21) Appl. No.: 10/054,434

(22) Filed: Jan. 18, 2002

(65) Prior Publication Data

US 2002/0059955 A1 May 23, 2002

Related U.S. Application Data (63) Continuation of application No. 09/390,555, filed on Sep. 3, 1999, now abandoned.

(51) Int. Cl.[7] .............................................. F16K 21/10
(52) U.S. Cl. .................... 137/514.7; 137/242; 137/529; 137/538; 251/172; 251/190
(58) Field of Search .............................. 137/242, 514.7, 137/528, 529, 533.17, 533.21, 538; 251/172, 175, 190

(56) References Cited

U.S. PATENT DOCUMENTS

| | | | | |
|---|---|---|---|---|
| 1,702,550 A | * | 2/1929 | Stevenson ................ | 137/538 X |
| 2,243,711 A | * | 5/1941 | Lamb ...................... | 137/529 X |
| 2,506,162 A | * | 5/1950 | Metzgar ................. | 137/514.7 X |
| 2,798,446 A | * | 7/1957 | Endrezze ................. | 137/529 X |
| 3,700,007 A | * | 10/1972 | Sparling et al. ......... | 251/190 X |
| 4,167,262 A | * | 9/1979 | Lemmon .................... | 251/25 |
| 4,173,327 A | * | 11/1979 | Williams .................... | 251/31 |
| 4,190,073 A | * | 2/1980 | Claycomb ................... | 137/238 |
| 4,316,598 A | * | 2/1982 | Maggio ....................... | 251/63 |
| 4,355,784 A | * | 10/1982 | Cain ........................... | 251/63 |
| 4,413,688 A | * | 11/1983 | Seabourn ................ | 137/529 X |
| 4,522,230 A | * | 6/1985 | Clapper et al. ....... | 137/514.7 X |
| 4,620,562 A | * | 11/1986 | Pacht ...................... | 137/529 X |
| 4,795,131 A | * | 1/1989 | Scarano et al. ............... | 251/63 |
| 5,152,554 A | * | 10/1992 | LaFleur et al. ............... | 285/88 |

(List continued on next page.)

FOREIGN PATENT DOCUMENTS

| | | | | |
|---|---|---|---|---|
| SU | 429215 | * | 10/1974 | .................. 137/529 |
| SU | 510612 | * | 6/1976 | .................. 137/529 |

OTHER PUBLICATIONS

SPM Brochure, 7601 Wyatt Dr., Ft. Worth, TX 76108, pp. 1–2, date unknown.*

Primary Examiner—John Rivell
(74) Attorney, Agent, or Firm—The Matthews Firm (57) ABSTRACT A pressure relief valve has a main valve body, a fluid inlet passageway, a fluid outlet passageway, and a piston contained within the main body. The piston has a piston head, slidingly and sealingly engaged within a pressurized cavity in the main valve body. The piston head's principal face, having a given surface area, is exposed to a pressurized gas in the cavity. A piston stem, connected to the piston head, is in sliding communication with a packoff assembly and has an exposed face whose surface area is smaller than the piston head's principal face. The piston stem's exposed face is in communication with the pressurized gas or fluids to be regulated. In operation, a gas or fluid pressurized to a predetermined value in the pressurized cavity acts against the piston head, forcing one or more ports in the piston stem sidewall to be sealed from the fluid outlet passageway. When pressurized gas or fluid in a pressure containment structure with which the pressure relief valve is in communication exceeds a second predetermined value, the pressurized gas or fluid in the pressure containment structure acts against the piston stem exposed face and forces the piston to move, exposing the ports in the piston stem to the fluid outlet passageway, thus relieving the excess pressure in the pressure containment structure. The packoff assembly has a wiper element slidingly and sealing in communication with the piston stem and keeps the piston stem and ports clear of contaminants.

20 Claims, 6 Drawing Sheets

U.S. PATENT DOCUMENTS 5,282,653 A * 2/1994 LaFleur et al. ............. 285/110
5,311,902 A * 5/1994 Overfield ................ 251/172 X
5,348,351 A * 9/1994 LaFleur et al. ............. 285/110
5,564,469 A * 10/1996 Tremoulet, Jr. et al. .... 137/540
5,586,084 A * 12/1996 Barron et al. ................ 367/85
5,950,650 A * 9/1999 Pacht ........................... 137/1

* cited by examiner

PRESSURE RELIEF VALVE

RELATED APPLICATIONS

This application is a continuation of U.S. patent application Ser. No. 09/390,555, filed on Sep. 3, 1999 now abandoned.

TECHNICAL FIELD

The present invention comprises an improved pressure relief valve for venting excess pressure from pressure containment structures.

BACKGROUND ART

Pressure can buildup in pressure containment structures such as but not limited to storage tanks, separators, heater treaters, steam generators, transportation lines, pump lines, pipelines, conduits, and the like. Human reaction times to curtail this pressure buildup may be unacceptable for several reasons, including absence of any humans in the area. Accordingly, pressure containment structure pressures can rise unacceptably, thereby rupturing the pressure containment structure and possibly damaging related equipment such as pumping equipment. In typical configurations, material in the pressure containment structures can be any gas, fluid, or combinations thereof.

Relief valves can help prevent ruptures due to pressure buildup and are typically inserted into or located within or near pressure containment structures to relieve pressure when the pressure reaches a predetermined level in the pressure containment structure. However, prior art pressure relief valves typically do not have reliable pressure setting capabilities.

The prior art includes the following patents and literature references: U.S. Pat. No. 5,282,653, issued to Karl K. LaFleur and Donald R. Wade; U.S. Pat. No. 5,348,351, issued to Karl K. LaFleur and Donald R. Wade; U.S. Pat. No. 5,152,554, issued to Karl K. LaFleur and Donald R. Wade; U.S. Pat. No. 4,167,262, issued to John C. Lemmon; U.S. Pat. No. 4,173,327, issued to William R. Williams; U.S. Pat. No. 4,190,073, issued to Jack R. Claycomb; U.S. Pat. No. 4,316,598, issued to Robert L. Maggio; U.S. Pat. No. 4,795,131, issued to Robert V. Scarano and Joseph A. Bolton; U.S. Pat. No. 4,355,784, issued to Lester L. Cain; and SPM, of Ft. Worth, Tex., makers of emergency relief valves part numbers 2A18138, 2A18192, and 2A29183.

Further, sand and other contaminants may be present in the fluid or gas in the pressure containment structure, for example from the purposeful addition of sand to fluids to aid in "fracturing" processes oftentimes used to enhance hydrocarbon production. Typically, prior art pressure relief valves utilize a plunger with a cone-shaped head that seals against an elastomer seat. When the plunger is activated, it moves away from the seat. Pressure is reduced, and when the plunger attempts to move back against the seat, sand or other contaminants may get trapped between the plunger and the seat, preventing the pressure relief valve from resealing. This tends to limit and even disable the pressure relief valve.

Pressure relief valves in the prior art typically have limited flow rates, making them unacceptable or ill-suited for handling the amount of pressurized fluid or gas when the pressure exceeds a predetermined level.

Moreover, pressure relief valves are oftentimes difficult to redress and maintain under field conditions and accordingly are usually repaired, if at all, at a location distant from the field such as the manufacturer's site or a repair depot.

It is therefore an objective of the present invention to provide an improved pressure relief valve with reliable pressure setting capabilities.

It is a further objective of the present invention to provide an improved pressure relief valve that prevents sand or other contaminants from getting trapped within the improved pressure relief valve.

It is a further objective of the present invention to provide an improved pressure relief valve that allows redressing and maintenance under field conditions.

SUMMARY OF THE INVENTION

The objects of the invention are achieved, generally, by a new and improved pressure relief valve, comprising a main valve body having a cylindrical cavity therein; a piston slidingly and sealing engaged within said cavity; a fluid inlet passageway in fluid communication with said piston; a fluid outlet passageway in fluid communication with said piston, said fluid inlet and fluid outlet passageways having no fluid communication with said cavity; and a regulating gas against which said piston moves in said cavity, said regulating gas having a pressure of a first predetermined value wherein said movement of said piston selectively permits fluid communication between said fluid inlet passageway and said fluid outlet passageway when pressure of fluid in said fluid inlet passageway exceeds a second predetermined value.

In another aspect of the invention, the pressure relief valve comprises a valve body having a cylindrical cavity therein having an internal sidewall of a given diameter; a piston having a cylindrical piston head with a top surface of a given area slidably positioned within said cylindrical cavity and sized to reciprocate within said cylindrical cavity while being in sealing engagement with the said sidewall, said piston also having a tubular piston stem with a sidewall and having a first open end and a second closed end in juxtaposition to said piston head, said closed end defining a face having an area smaller than said given area, said tubular piston stem having a least one port through its side wall; a fluid inlet passageway in communication with the open end of said tubular piston stem for receiving the fluid whose pressure is to be relieved when excessive; a pack off assembly within said valve body sealingly and slidably engaged against the exterior surface of the sidewall of said tubular piston stem; an end cap threadedly engaged to, and completing the closure of said valve body, said pack off assembly being in juxtaposition to said end cap; a connection to said valve body in fluid communication with said cylindrical cavity through which a pressurized gas can be used as a force against the top surface of said piston head; and a fluid outlet passageway in said valve body which is in fluid communication with the interior of said tubular piston stem through its at least one port responsive to the pressure of the fluid in said fluid inlet passageway, exceeding a predetermined pressure working against said defined face at the closed end of said tubular piston stem.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

GENERAL DESCRIPTION AND PREFERRED MODE FOR CARRYING OUT THE INVENTION

Figure 1:
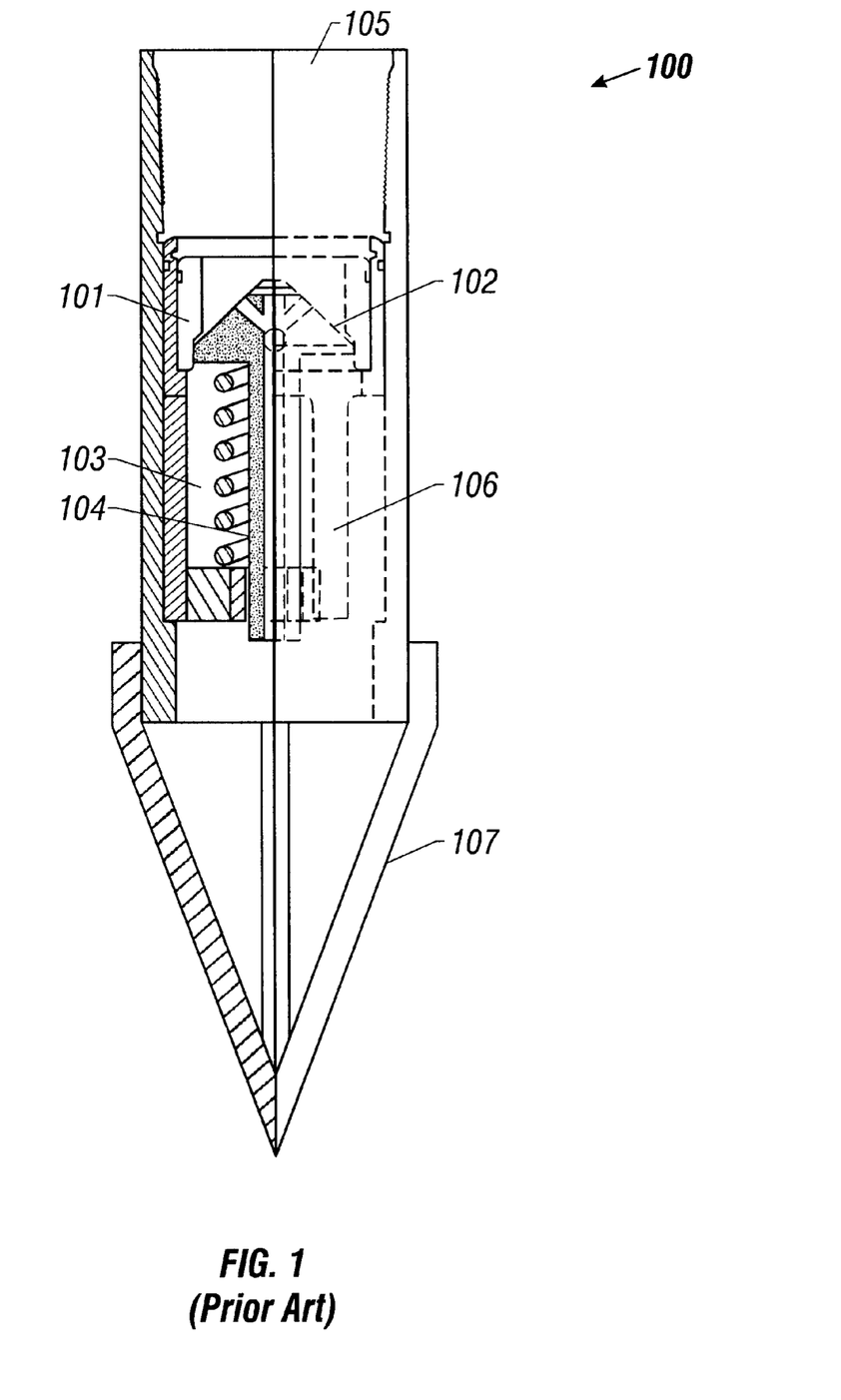
FIG. 1 is an elevated, cross-sectional view of an exemplary relief valve known in the prior art.

FIG. 1, a cross-sectional view of an exemplary relief valve known in the prior art, illustrates how prior art relief valves 100 typically operate. Prior art relief valves 100 typically comprise cone-shaped head 102 which seals against seat 101 when the force acting against head 102 by fluids or gasses in inlet 105 is less than the force exerted by spring 103. When the force acting against head 102 exceeds the force exerted by spring 103, head 102 and plunger 104 travel into relief body 106, allowing fluids or gasses to pass through relief valve 100 until the force exerted against head 102 returns to a value less than the force exerted by spring 103. In some versions of these relief valves, fluids exit through one or more openings 107.

Spring 103 is inherently a point of failure due to fatigue and other factors. Further, the pressure at which relief valve 100 operates is difficult to keep at its desired, predetermined level due to inherent hysteresis. Spring 103 is also difficult to adjust in the field as such adjustments typically require access to spring 103.

Additionally, contaminants in the fluid or gas entering at inlet 105 may become trapped between seat 101 and head 102, causing leakage or outright failure of valve 100.

Figure 2:
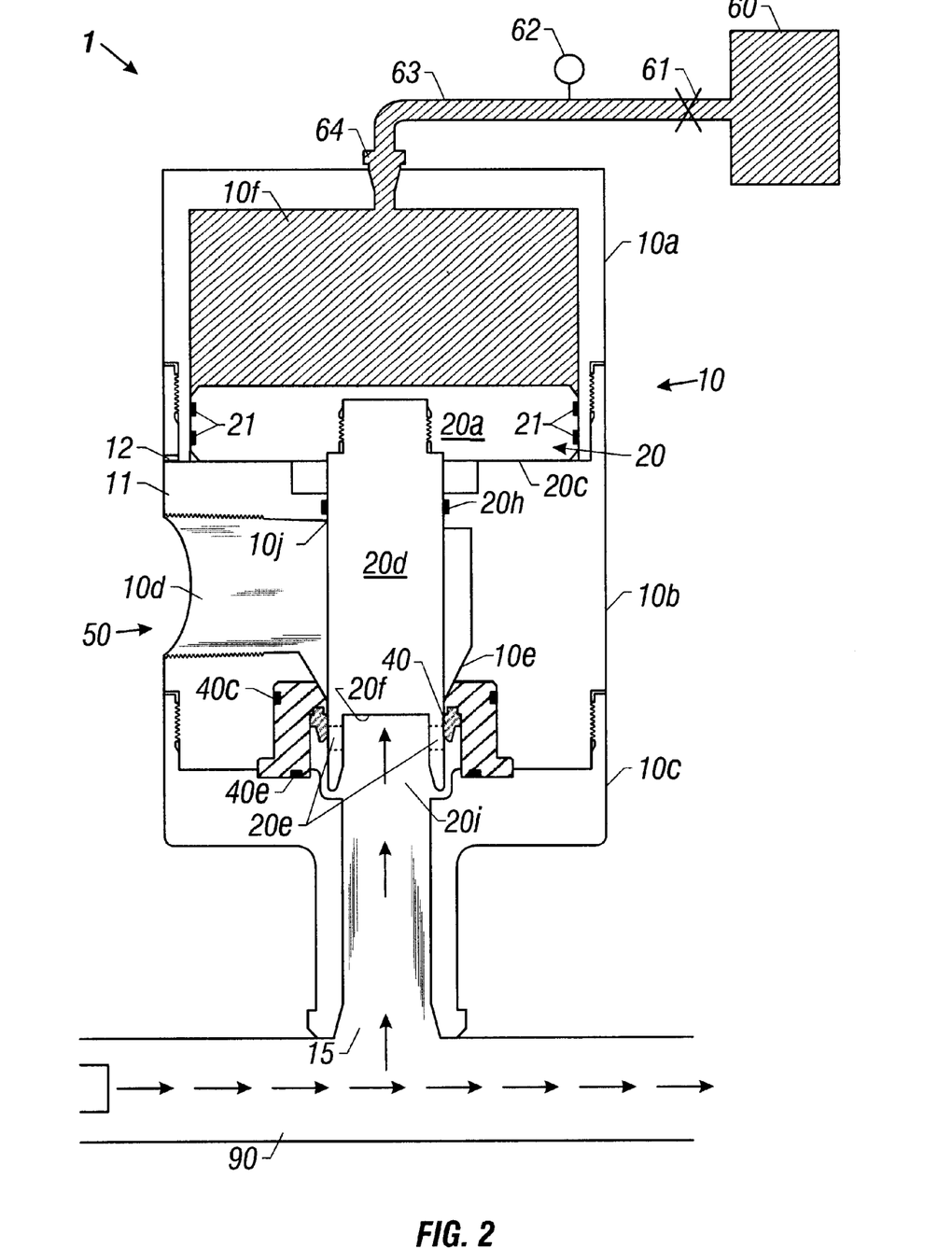
FIG. 2 is an elevated view, partially in cross section, of the present invention's improved pressure relief valve in a closed position.

Referring now to FIG. 2, in which a cross-sectional view of the present invention's improved pressure valve is shown in a closed position, pressure relief valve 1 is adapted for connecting to pressure containment structure 90 for relieving pressure within pressure containment structure 90 at a predetermined value. This value may be field adjusted and/or maintained by an external source such as pressure bottle 60 filled with pressurized gas, for example, nitrogen. Pressure containment structure 90 may be pipelines; tanks; pressure chambers; containers capable of restraining gasses, liquids, or mixes of gasses and liquids under pressure; or any combination of these.

Pressure relief valve 1 comprises valve body 10, relief passageway 10d, piston 20, and regulating chamber 10f. As described in more detail herein below, relief passageway 10d can be a small tubular in communication with both the exterior of pressure relief valve 1 and its internal components, or can be a cavity within pressure relief valve 1 terminating in or at exhaust port 50, or any other relief passageway sufficient to accept fluids or gas under pressure.

Valve body 10 is further comprised of pressure cap 10a, main body 10b, and line cap 10c. In the preferred embodiment, relief passageway 10d is a cavity within main body 10b, with pressure chamber base 11 defining the upper limit of relief passageway 10d within main body 10b and the lower limit of regulating chamber 10f. Pressure chamber base 11 may be integral with main body 10b, such as from a single machined block as in the preferred embodiment, or may be a separate piece attached to the interior wall of main body 10b. Pressure relief port 12 is located between pressure chamber base 11 and the lower face 20c of piston 20 to allow atmospheric fluids or air to enter into and/or be exhausted from the space between pressure chamber base 11 and lower face 20c as piston 20 reciprocates within main body 10b.

Pressure cap 10a is removably secured onto main body 10b, thus defining the top, sealing end of regulating chamber 10f. Pressure cap 10a and main body 10b are cooperatively threaded and grooved to allow pressure cap 10a to be removably attached to main body 10b. Alternatively, pressure cap 10a may be permanently secured to main body 10b. In a further alternative embodiment, pressure cap 10a may be integral with main body 10b. In further alternatives, pressure cap 10a can be removably secured onto main body 10b using non-threaded means, such as locking pins, clamps, or by any alternative means appropriate to secure pressure cap 10a to main body 10b.

Regulating chamber 10f is charged with a non-volatile fluid or gas, such as nitrogen, to a predetermined pressure. Pressure cap 10a may further include regulating inlet 64 to accept fluid or gas under pressure to aid in regulating the pressure within regulating chamber 10f. Regulating inlet 64 is a valve, as in the preferred embodiment, or any other inlet for accepting fluids or gasses including regulators, gauges, or nozzles. In this manner, the pressure response of improved pressure relief valve 1 may be adjusted and/or maintained in the field, including unattended maintenance. For example, regulating inlet 64 may be a valve attached to supply conduit 63 which may itself be attached to a source of regulating pressure such as pressure bottle 60. In this embodiment, gauge 62 and regulator 61 may also be attached to supply conduit 63 to automatically maintain the pressure in regulating chamber 10f at predetermined levels by permitting the admission of pressurized fluid or gas into or removal of pressurized fluid or gas out from regulating chamber 10f.

In an alternative embodiment, no regulating inlet 64 is required. In this alternative embodiment, pressure within regulating chamber 10f is pre-set to a predetermined value and pressure cap 10a sealed to maintain that desired value.

In a further alternative embodiment, a spring (neither illustrated nor preferred) may be used in place of a pressurized fluid or gas. The spring would be pretensioned to apply the desired force and/or field adjusted to apply the desired force.

Figure 3:
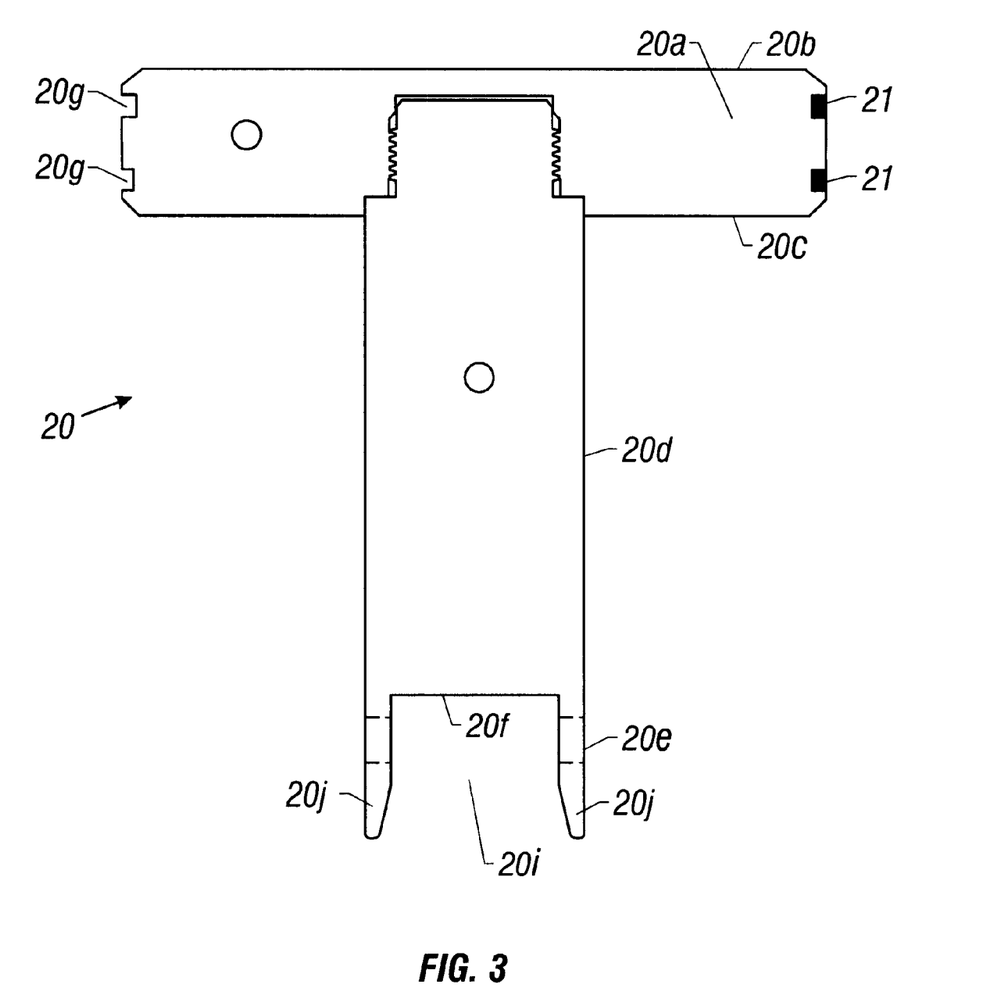
FIG. 3 is a pictorial view of the piston used in the present invention.

Referring now to FIG. 2 and FIG. 3, in which a cross-sectional view of piston 20 is illustrated, piston 20 comprises a piston head 20a, having an upper face 20b and a lower face 20c, and a piston stem 20d, having at least one piston port 20e and stem face 20f. Piston seals 21, such as O-rings, are seated into corresponding groves 20g in piston head 20a to be in communication with inner surfaces of regulating chamber 10f. Aperture 10j in pressure chamber base 11 accepts piston stem 20d. Piston seal 20h, e.g., an O-ring, seals piston stem 20d from regulating chamber 10f, preventing sand or other material from going above piston seal 20h and being trapped between lower face 20c and pressure chamber base 11. While in the preferred embodiment piston seal 20h is an O-ring, piston seal 20h may be any seal on piston stem 20d capable of sealing relief passageway 10d from regulating chamber 10f.

For ease of field maintenance, piston stem 20d is removably attached to piston head 20a such as by having piston stem 20d threaded and screwed into piston head 20a. In alternative embodiments, the attachment of piston stem 20d into piston head 20a may be through any means of attachment which allow for field removal and installation. In still other embodiments, piston stem 20d may be integral with piston head 20a and the entire piston 20 removable for field redressing and maintenance.

Piston stem 20d terminates in stem fluid passageway 20i which is in fluid communication with inlet 15. One or more piston ports 20e are integral with sidewalls 20j forming stem fluid passageway 20i and are located distally from piston head 20a, proximate stem face 20f. Piston port 20e is in fluid communication with inlet 15 as piston 20 travels within valve body 10. Piston port 20e provides for selected communication of gases or fluids from inlet 15 into relief passageway 10d through piston ports 20e.

Figure 4:
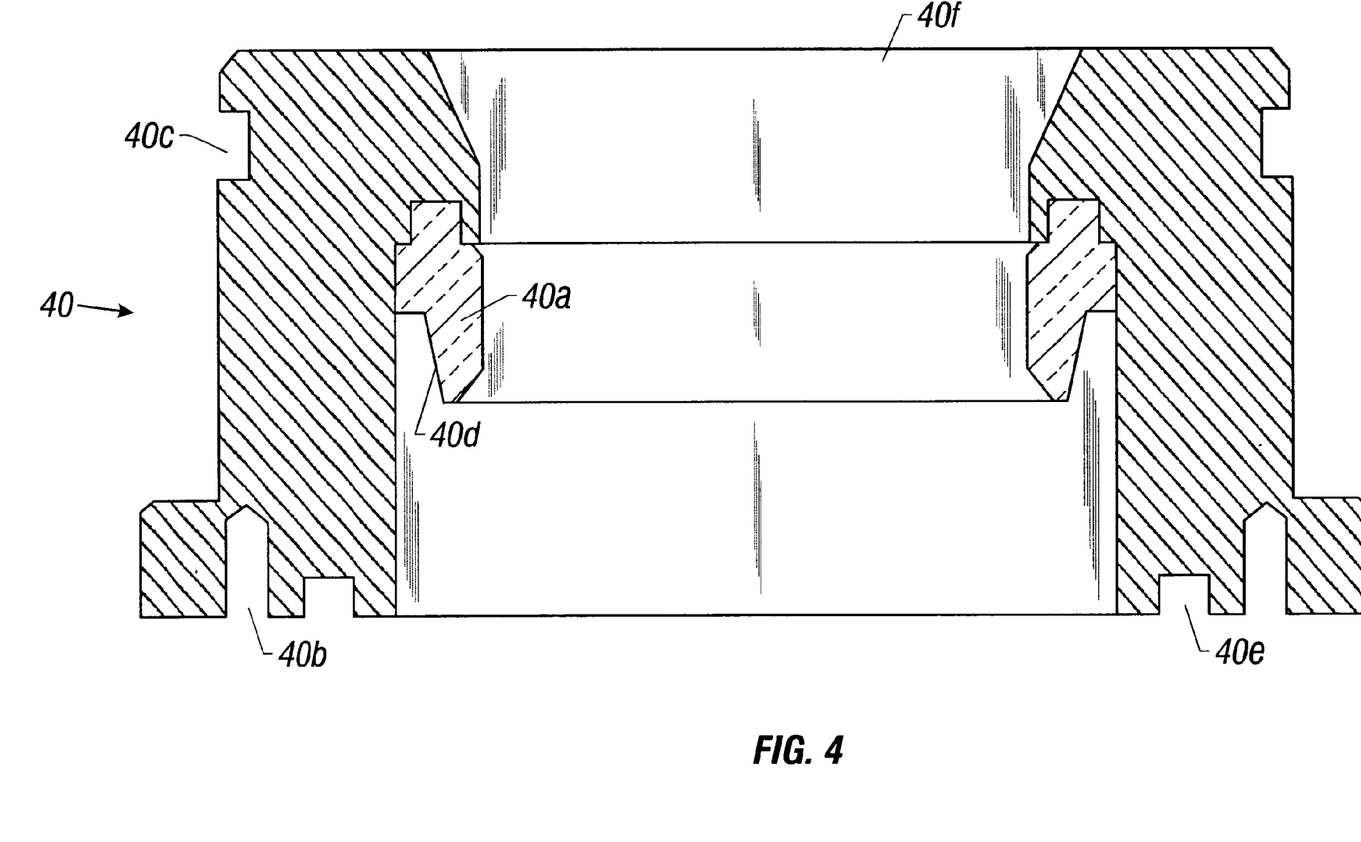
FIG. 4 is a pictorial view, partly in cross section, of a packoff assembly used in the present invention.

Referring now to FIG. 4, in which a cross-sectional view of packoff assembly 40 is illustrated, cylindrical bore 40f in packoff assembly 40 accepts piston stem 20d (not shown in FIG. 4) and includes elastomer wiping element 40a. Packoff assembly 40 is of the type described in any of U.S. Pat. No. 5,152,554, "Coupling Apparatus", issued Oct. 6, 1992; U.S. Pat. No. 5,282,653, "Coupling Apparatus", issued Feb. 1, 1994; and U.S. Pat. No. 5,348,351, "Coupling Apparatus", issued Sep. 20, 1994. One such unit, as used in the preferred embodiment, is available from LaFleur Petroleum Services (LPS), located in Weatherford, Tex. and identified as LPS Packoff model SPPRV.

Wiping element 40a acts both as a seal and a cleaning mechanism in communication with piston stem 20d. Additionally, pressure from fluids or gases acting against wiper flaps 40d force wiper flaps 40d against piston stem 20d, aiding in maintaining a seal. Wiping element 40a is made of an appropriate high pressure, high integrity elastomeric material, and contaminants such as sand which get trapped by wiping element 40a tend to be embedded in wiping element 40a rather than obstructing wiping element 40a from piston stem 20d. Accordingly, as piston stem 20d moves through packoff assembly 40, packoff assembly 40 wipes piston stem 20d clean of sand and other material, especially around the ports 20e, removing any contaminants which would otherwise prevent piston 20 from traveling its full stroke and limiting the effectiveness of the improved pressure relief valve 1, as well as removing sand or other contaminants which would otherwise clog piston port or ports 20e. Piston stem 20d is slidingly engaged through packoff assembly 40 such that piston port ports 20e can be exposed to or sealed off from relief passageway 10d or obscured from relief passageway 10d.

Referring now to FIG. 2 and FIG. 4, packoff assembly 40 is removably but securely seated into main body 10b, thus preventing packoff assembly 40 from moving when piston stem 20d moves. Seal slots 40c are present to accept a seal such as an O-ring (unnumbered) to seal packoff assembly 40 when seated in main body 10b. Additionally, packoff assembly 40 has sealing slots 40e for accepting seals to seal packoff assembly 40 against line cap 10c. Packoff assembly 40 has additional slots 40b for attaching a puller (not illustrated) to aid in removing packoff assembly 40 from main body 10b. Slots 40b may be threaded, if desired.

Line cap 10c removably attaches to main body 10b via threaded connector. In alternative embodiments, line cap 10c removably attaches to main body 10b via any appropriate connector to allow for field redressing and maintenance of the present invention. Line cap 10c connects improved pressure relief valve 1 to pressure containment structure 90 at inlet 15 via any appropriate means such as threaded connectors or welded connections at inlet 15. Inlet 15 accepts pressurized gas or fluid from pressure containment structure 90 and is integral with line cap 10c. Alternatively, inlet 15 may be a connector such as a T-connector for connecting line cap 10c to pressure containment structure 90.

Pressure cap 10a, packoff assembly 40, and line cap 10c are removably connected to main body 10b and piston stem 20d is removably connected to piston head 20a, increasing the ease with which improved pressure relief valve 1 may be redressed and maintained under field conditions.

Figure 5:
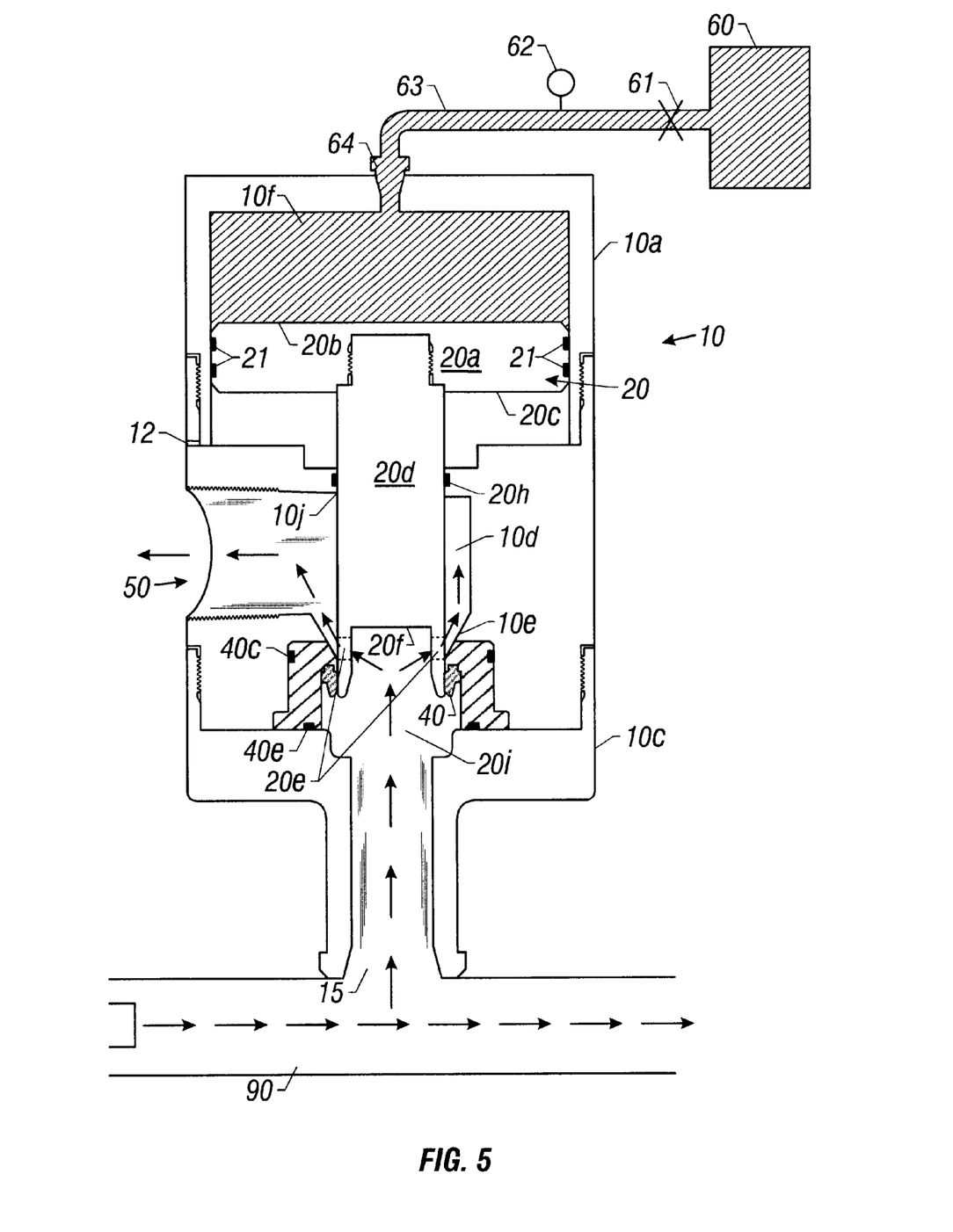
FIG. 5 is an elevated view, partly in cross section, of the present invention's improved pressure relief valve in an open, or relief, position.

As illustrated in FIG. 2, piston 20 has a closed position in which pressurized gas or fluids are maintained within pressure containment structure 90. As illustrated in FIG. 5, piston 20 also has an open position in which material under pressure within pressure containment structure 90 is exhausted and pressure relieved by the venting of the pressurized gas or fluids within pressure containment structure 90 through piston port 20e, out through exhaust port 50.

Relief passageway 10d extends through main body 10b and terminates in exhaust port 50, thus allowing material to exit main body 10b through exhaust port 50 when piston port 20e is exposed to and in communication with relief passageway 10d. Additionally, exhaust port 50 may be configured to accept a variety of connectors, thereby allowing the exhausted material, whether gas or fluid or both, either to be captured by a capture structure (not illustrated) or routed to an open capture pit or vented into the atmosphere. Accordingly, exhaust port 50 may be grooved or threaded to accept a correspondingly threaded or grooved insert, or be fitted with other types of connection acceptors such as quick release type connections. Relief passageway 10d and exhaust port 50 allow for improved flow rates over the prior art relief valves.

Figure 6:
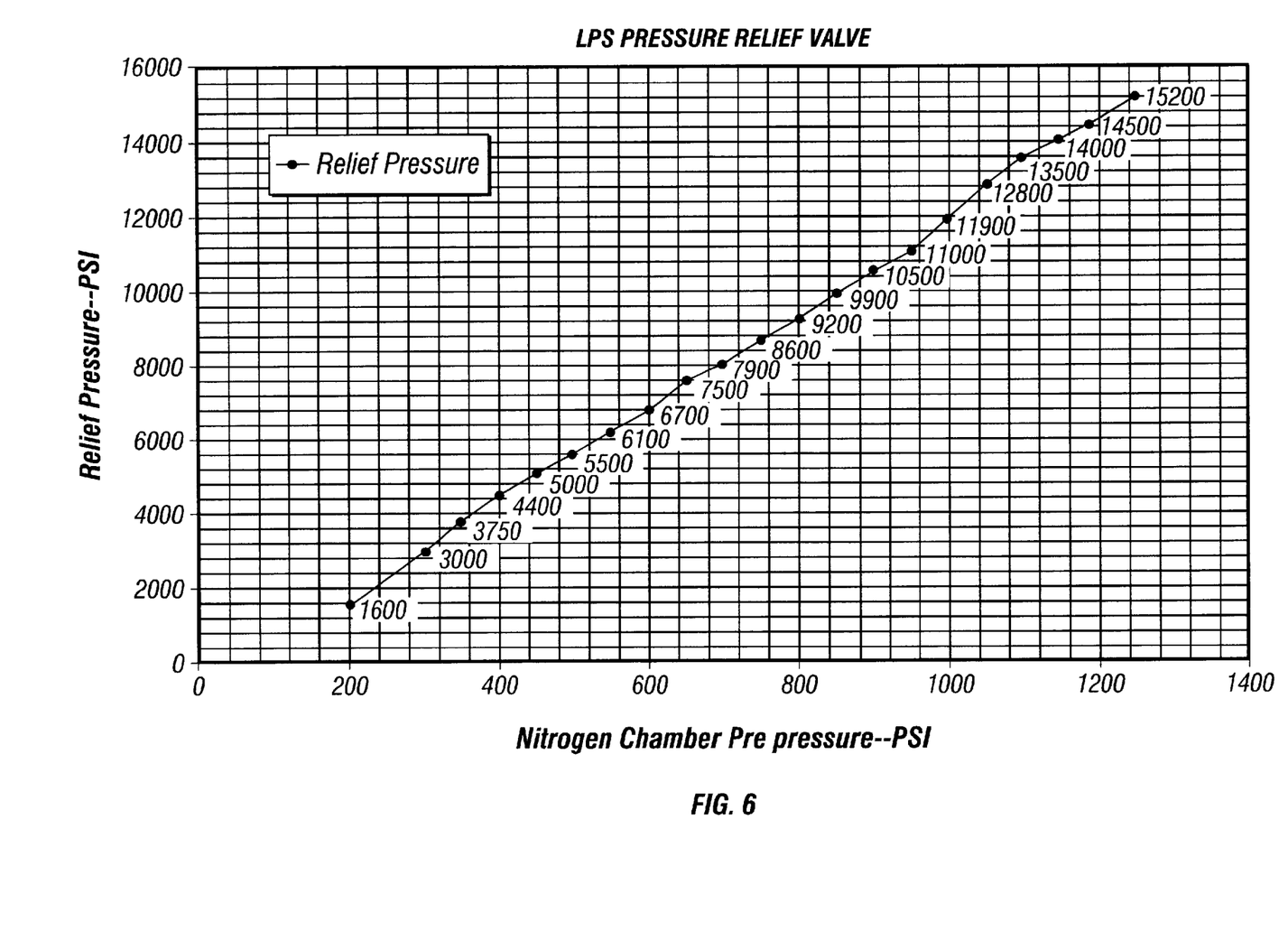
FIG. 6 is a graph indicating an exemplary relationship between chamber pressure and relief pressure expected to be experienced in the pressure relief valve according to the present invention.

In the operation of the preferred embodiment, regulating chamber 10f is charged with a gas such as nitrogen to a predetermined pressure through regulating inlet 64. As illustrated in FIG. 6, an exemplary chart of pressure ratios illustrating the ratio of top area 20b of piston 20 to face area 20f of piston stem 20d, there is defined the ratio between the pressure in regulating chamber 10f and the pressure at which the present invention's improved pressure relief valve 1 begins to allow material under pressure in pressure containment structure 90 to be relieved. As illustrated in FIG. 6, a greater than a ten-to-one ratio may be obtained whereby a given pressure in regulating chamber 10f maintains pressure in pressure containment structure 90 at a significantly higher amount. As but one example, FIG. 6 indicates that a pressure within regulating chamber 10f of 600 psi balances a pressure of 6700 psi in pressure containment structure 90. This ratio is of course determined by the ration of the areas of top area 20b and face area 20f.

The force of the pressure in regulating chamber 10f operates against piston head 20b, forcing piston 20 through main body 10b, positioning piston port 20e into line cap 10c and, more specifically, securing piston 20 into its closed position and removing piston port 20e from communication with relief passageway 10d.

Referring specifically to FIG. 5, in piston's 20 open position, when the force exerted on stem face 20f by pressure of the gases or fluids at inlet 15 exceeds a predetermined force exerted on upper face 20b by pressure in regulating chamber 10f, piston stem 20d slides piston 20 into regulating chamber 10f until piston port 20e is in communication with relief passageway 10d, allowing the gases or fluids present at inlet port 15 to vent through piston port 20e into relief passageway 10d and, if so configured, out exhaust port 50.

As piston 20 reciprocates, piston stem 20d and piston port 20e are forced through packoff assembly 40. Packoff assembly 40, especially wiping element 40a, is fitted tightly about piston stem 20d and displaces sand and/or other contaminants from stem 20d and piston port 20e as these elements move through packoff assembly 40.

It may be seen from the preceding description that an improved pressure relief valve such as those used in hydrocarbon wells is provided.

It is noted that the embodiment of the improved pressure relief valve described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An improved pressure relieve valve operable for use with fluid containing sand, comprising:
    a main valve body having a cylindrical cavity therein;
    a piston, having a piston stem and a piston head, slidingly and sealingly engaged within said cavity;
    a fluid inlet passageway in fluid communication with said piston stem;
    a fluid outlet passageway in communication with said piston stem, said fluid inlet and fluid outlet passageways having no fluid communication with said cavity;
    a pressurized gas against which said piston moves in said cavity, said gas having a pressure of a first predetermined value,
    wherein the movement of said piston permits fluid communication between said fluid inlet passageway and said fluid outlet passageway responsive to the pressure of fluid in said fluid inlet passageway exceeding a second predetermined value;
    an internal fluid passageway along at least a portion of the length of said piston stem, said internal passageway terminating at an end face within said piston stem; and
    a sidewall surrounding said internal fluid passageway, said side wall having at least one port through said side wall, whereby said at least one port permits fluid communication between said fluid inlet passageway and said fluid outlet passageway when the pressure of fluid in said fluid inlet passageway exceeds said second predetermined value, and said at least one port has a sufficient size to thereby automatically reduce the pressure of fluid in said fluid inlet passageway below said second predetermined value.

2. The relief valve of claim 1, wherein said pressurized gas is non-volatile gas.

3. The relief valve of claim 1, wherein said gas is nitrogen.

4. The relief valve of claim 1, wherein said piston further comprises:
    a piston head slidingly and sealingly engaged within said cavity, said piston head having a principal face of a given surface area; and
    a piston stem slidably movable within said main valve body, said piston stem being integrally connected to said piston head.

5. The relief valve of claim 4, wherein said piston stem is removably integrally connected to said piston head.

6. The relief valve of claim 4, wherein said piston stem further comprises:
    said end face within said internal fluid passageway of a surface area less than the given surface area of the principal face of said piston head.

7. The improved relief valve of claim 6, further comprising a packoff assembly secured in said main valve body surrounding at least a portion of said piston stem to wipe said piston stem as it moves.

8. The relief valve of claim 7, further comprising a seal disposed in between said piston head and said fluid outlet passageway, wherein said seal is in communication with said piston stem.

9. The relief valve of claim 8, wherein said seal is an O-ring.

10. The relief valve of claim 1, further comprising a pressure cap removably connected to a first end of said main valve body, wherein said pressure cap forms an upper end of said cavity.

11. The relief valve of claim 10, wherein said pressure cap further comprises an aperture for accepting said pressurized gas into said cavity.

12. The relief valve of claim 11, wherein said pressure cap further comprises a valve connected at said aperture for accepting said pressurized gas.

13. The relief valve of claim 1, wherein said fluid inlet passageway further comprises a line cap removably connected to a second end of said main valve body.

14. The relief valve of claim 4, wherein said fluid inlet passageway further comprises a line cap removably connected to a first end of said main valve body, said line cap further comprising an aperture for accepting a packoff assembly and an inlet passageway that is integral with said line cap and in communication with said piston stem's said internal fluid passageway.

15. The relief valve of claim 7, wherein said packoff assembly is removably secured in said main valve body.

16. The relief valve of claim 1, further comprising a sidewall in said main valve body having pressure relief port wherein said relief port is in communication with said cavity.

17. The relief valve of claim 1, wherein said at least one port is sized to permit sand to flow therethrough.

18. The relief valve of claim 1, wherein said at least one port comprises a plurality of ports such that all of said plurality of ports are axially spaced from said end face by the same distance.

19. An improved pressure relief valve operable for use with fluid containing sand, comprising:
    a valve body having a cylindrical cavity therein having an internal sidewall of a given diameter;
    a piston having a cylindrical piston head with a top surface of a given area slidably positioned within said cylindrical cavity and sized to reciprocate within said cylindrical cavity while being in sealing engagement with the said sidewall, said piston also having a tubular piston stem with a sidewall and having a first open end and a second closed end in juxtaposition to said piston head, said second closed end defining a face having an area smaller than said given diameter, said tubular piston stem having a least one port through said side wall;
    a fluid inlet passageway in communication with the open end of said tubular piston stem for receiving the fluid whose pressure is to be relieved when excessive;
    a pack off assembly within said valve body sealingly and slidably engaged against the exterior surface of the sidewall of said tubular piston stem;

a connection to said valve body in fluid communication with said cylindrical cavity through which a pressurized gas can be used as a force against the top surface of said piston head; and a fluid outlet passageway in said valve body which is in fluid communication with the interior of said tubular piston stem through said at least one port responsive to the pressure of the fluid in said fluid inlet passageway, exceeding a predetermined pressure working against said defined face at said second closed end of said tubular piston stem.

20. The relief valve of claim 19, wherein said at least one port has a sufficient size to thereby automatically reduce said pressure of said fluid in said fluid inlet passageway from exceeding said predetermined pressure to a value equal to or below said predetermined pressure.

* * * * *